(12) United States Patent
Kucharewski et al.

(10) Patent No.: US 7,908,327 B2
(45) Date of Patent: Mar. 15, 2011

(54) PEOPLE LISTS

(75) Inventors: Valerie Kucharewski, San Jose, CA (US); Michael Traylor, Millbrae, CA (US); Michael Anthony Buonomo, Round Hill, VA (US); John Panzer, Mountain View, CA (US); Jack Mazzeo, Santa Clara, CA (US)

(73) Assignee: AOL Inc., Dulles, VA (US)

( * ) Notice: Subject to any disclaimer, the term of this patent is extended or adjusted under 35 U.S.C. 154(b) by 1364 days.

(21) Appl. No.: 10/715,215

(22) Filed: Nov. 18, 2003

(65) Prior Publication Data

US 2004/0199582 A1    Oct. 7, 2004

Related U.S. Application Data

(60) Provisional application No. 60/426,812, filed on Nov. 18, 2002, provisional application No. 60/426,806, filed on Nov. 18, 2002, provisional application No. 60/477,333, filed on Jun. 11, 2003.

(51) Int. Cl.
G06F 15/16 (2006.01)

(52) U.S. Cl. ..................................................... 709/206

(58) Field of Classification Search .................. 709/206, 709/207
See application file for complete search history.

(56) References Cited

U.S. PATENT DOCUMENTS

| | | | |
|---|---|---|---|
| 5,425,028 A | 6/1995 | Bitton et al. | |
| 5,706,501 A | 1/1998 | Horikiri et al. | |
| 5,761,196 A | 6/1998 | Ayerst et al. | |
| 5,835,089 A | 11/1998 | Skarbo et al. | |
| 5,864,684 A * | 1/1999 | Nielsen | 709/206 |
| 5,870,744 A | 2/1999 | Sprague | |
| 5,897,635 A | 4/1999 | Torres et al. | |
| 5,913,032 A | 6/1999 | Schwartz et al. | |
| 5,938,725 A * | 8/1999 | Hara | 709/206 |
| 5,950,193 A | 9/1999 | Kulkarni | |
| 5,961,620 A * | 10/1999 | Trent et al. | 709/245 |
| 5,974,446 A | 10/1999 | Sonnenreich et al. | |
| 5,987,376 A | 11/1999 | Olson et al. | |
| 5,999,932 A | 12/1999 | Paul | |
| 6,064,723 A | 5/2000 | Cohn et al. | |
| 6,134,582 A * | 10/2000 | Kennedy | 709/206 |
| 6,189,026 B1 | 2/2001 | Birrell et al. | |
| 6,199,099 B1 | 3/2001 | Gershman et al. | |
| 6,247,043 B1 * | 6/2001 | Bates et al. | 709/206 |
| 6,269,369 B1 | 7/2001 | Robertson | |
| 6,349,299 B1 | 2/2002 | Spencer et al. | |
| 6,360,251 B1 | 3/2002 | Fujita et al. | |
| 6,392,669 B1 | 5/2002 | Matoba et al. | |
| 6,442,591 B1 * | 8/2002 | Haynes et al. | 709/206 |

(Continued)

OTHER PUBLICATIONS

Tang ,John et al. ,"ConNexus to Awarenex: Extending awareness to mobile users", Sun Microsystems Laboratories, SIGCHI 2001, ACM 1-58113-327, Mar. 31-Apr. 5 2001,ACM vol. 3. Iss.1 pp. 221-228.*

(Continued)

*Primary Examiner* — Ajay Bhatia
(74) *Attorney, Agent, or Firm* — Finnegan, Henderson, Farabow, Garrett & Dunner LLP

(57) ABSTRACT

Enabling management of contacts includes passively recognizing a set of contacts that are, as a group, repeatedly sent communications by a member, bringing the member's attention to the recognized set of contacts, enabling the member to name the set of contacts, and enabling the member to address future communications to the set of contacts through use of the name associated by the member with the set of contacts.

26 Claims, 7 Drawing Sheets

U.S. PATENT DOCUMENTS

| | | | |
|---|---|---|---|
| 6,457,044 | B1 | 9/2002 | IwaZaki |
| 6,463,471 | B1 | 10/2002 | Dreke et al. |
| 6,480,885 | B1 | 11/2002 | Olivier |
| 6,493,703 | B1 | 12/2002 | Knight et al. |
| 6,507,866 | B1 * | 1/2003 | Barchi .................. 709/207 |
| 6,539,421 | B1 | 3/2003 | Appelman et al. |
| 6,549,933 | B1 | 4/2003 | Barrett et al. |
| 6,549,937 | B1 | 4/2003 | Auerbach et al. |
| 6,564,264 | B1 | 5/2003 | Creswell et al. |
| 6,567,796 | B1 | 5/2003 | Yost et al. |
| 6,643,669 | B1 | 11/2003 | Novak et al. |
| 6,677,968 | B1 | 1/2004 | Appelman |
| 6,678,719 | B1 * | 1/2004 | Stimmel .................. 709/204 |
| 6,687,362 | B1 | 2/2004 | Lindquist et al. |
| 6,694,353 | B2 | 2/2004 | Sommerer |
| 6,701,348 | B2 | 3/2004 | Sommerer |
| 6,760,753 | B1 * | 7/2004 | Ohgushi et al. .......... 709/206 |
| 6,901,398 | B1 | 5/2005 | Horvitz et al. |
| 6,952,805 | B1 * | 10/2005 | Tafoya et al. ............ 709/206 |
| 6,985,943 | B2 | 1/2006 | Deryugin et al. |
| 7,032,007 | B2 * | 4/2006 | Fellenstein et al. ...... 709/206 |
| 7,096,009 | B2 | 8/2006 | Mousseau et al. |
| 7,139,806 | B2 * | 11/2006 | Hayes et al. ............ 709/207 |
| 7,194,516 | B2 | 3/2007 | Giacobbe et al. |
| 7,275,215 | B2 | 9/2007 | Werndorfer et al. |
| 7,543,243 | B2 * | 6/2009 | Schwartz et al. ......... 715/811 |
| 2001/0002469 | A1 | 5/2001 | Bates et al. |
| 2001/0013050 | A1 | 8/2001 | Shah |
| 2002/0023132 | A1 | 2/2002 | Tornabene et al. |
| 2002/0049610 | A1 | 4/2002 | Gropper |
| 2002/0049751 | A1 | 4/2002 | Chen et al. |
| 2002/0052921 | A1 | 5/2002 | Morkel |
| 2002/0054092 | A1 | 5/2002 | Hedloy |
| 2002/0059425 | A1 | 5/2002 | Belfiore et al. |
| 2002/0095663 | A1 * | 7/2002 | Joory .................... 717/136 |
| 2002/0097856 | A1 | 7/2002 | Wullert, II |
| 2002/0169748 | A1 | 11/2002 | Macholda |
| 2003/0037114 | A1 * | 2/2003 | Nishio et al. ............ 709/206 |
| 2003/0058478 | A1 | 3/2003 | Aoki |
| 2003/0078981 | A1 * | 4/2003 | Harms et al. ............ 709/206 |
| 2003/0154373 | A1 | 8/2003 | Shimada et al. ......... 713/168 |
| 2003/0158860 | A1 | 8/2003 | Caughey |
| 2003/0220946 | A1 | 11/2003 | Malik |
| 2003/0220976 | A1 | 11/2003 | Malik |
| 2004/0003071 | A1 * | 1/2004 | Mathew et al. .......... 709/223 |
| 2004/0029572 | A1 | 2/2004 | Nerot |
| 2004/0044536 | A1 | 3/2004 | Fitzpatrick et al. |
| 2004/0052356 | A1 | 3/2004 | McKinzie et al. |
| 2004/0054646 | A1 | 3/2004 | Daniell et al. |
| 2004/0054736 | A1 | 3/2004 | Daniell et al. |
| 2004/0219936 | A1 | 11/2004 | Kontiainen |
| 2005/0198131 | A1 * | 9/2005 | Appelman et al. ....... 709/204 |
| 2005/0198172 | A1 * | 9/2005 | Appelman et al. ....... 709/206 |
| 2006/0031772 | A1 * | 2/2006 | Valeski .................. 715/751 |
| 2006/0047747 | A1 | 3/2006 | Erickson et al. |
| 2006/0288077 | A1 * | 12/2006 | Chen .................... 709/206 |
| 2007/0092072 | A1 * | 4/2007 | Jacobs .................. 379/142.06 |

OTHER PUBLICATIONS

International Search Report of PCT/US03/36654 dated Aug. 17, 2004.

Office Action, U.S. Appl. No. 10/715,214, dated Apr. 20, 2007, 41 pages.

Kyungkoo Jun, et al., "Agent-Based Resource Discovery", IEEE(2000), 10 pages.

"Creating a Single List of Contacts—Google Scholar" available at http://scholar.google.com/scholar?hl=en&lr=&q=creating+a+single+list+list+of+contacts&as_... (Mar. 27, 2007).

European Search Report, European Application No. 03781972.9-2201, dated Feb. 8, 2008, 5 pages.

Office Action, U.S. Appl. No. 10/715,214, dated Oct. 9, 2007, 24 pages.

Boyce, Jim, "Microsoft Office Outlook 2003 Inside Out," Microsoft Press (published Nov. 12, 2003), pp. 252.

* cited by examiner

PEOPLE LISTS

CROSS REFERENCE TO RELATED APPLICATIONS

This application claims the benefit of U.S. Provisional Application No. 60/426,812, filed Nov. 18, 2002, and titled "People Sharing: Groups/Lists/Rostering," and claims the benefit of U.S. Provisional Application No. 60/426,806, filed Nov. 18, 2002, and titled "Software Enabling and Enhancing Communications and Functionality At A Client Computer," and claims the benefit of U.S. Provisional Application No. 60/477,333, filed Jun. 11, 2003, and titled "People Lists", all of which are incorporated by reference.

TECHNICAL FIELD

This document relates to the identification and creation of lists of contacts to which electronic messages may be sent from one or more communications applications.

BACKGROUND

Many activities that leverage the Internet involve communicating and sharing messages (a.k.a., sending messages). Multiple communications programs may be used to send messages over the Internet. For example, separate applications exist for sending e-mail messages, instant messages, digital pictures, and electronic calendar information. These different applications may be used to send messages to common people or common groups of people. However, conventionally, each application typically stores a separate list of people or groups of people with whom communication using that application regularly occurs. For example, an e-mail application has an address book, and an instant messaging application has a buddy list.

SUMMARY

In one general aspect, enabling management of contacts includes passively recognizing a set of contacts that are, as a group, repeatedly sent communications by a member, bringing the member's attention to the recognized set of contacts, enabling the member to name the set of contacts, and enabling the member to address future communications to the set of contacts through use of the name associated by the member with the set of contacts.

Implementation may include one or more of the following features. For example, in one implementation, passively recognizing the set of contacts may include storing communications sent by the member during a period of time, examining the communications sent by the member during the period of time, and identifying a set of contacts that was sent at least a minimum number of communications by the member during the period of time.

In another implementation, passively recognizing the set of contacts may include storing a predetermined number of communications sent by the member, examining the predetermined number of communications sent by the member, and identifying a set of contacts that was sent at least a minimum number of communications out of the predetermined number of communications by the member.

The member may be enabled to accept or to reject the recognized set of contacts brought to the member's attention. The member may be enabled to delay a rejected set of contacts from being brought to the member's attention. The member may be enabled to assign a unique identifier to the set of contacts.

In one implementation, the communications sent to the set of contacts and the future communications may be sent from multiple applications.

The multiple applications may include communications applications. The communications applications may include an e-mail application and at least one application other than an e-mail application. The communications applications may include an instant messaging application and at least one application other than an instant messaging application. The communications applications may include a digital image sharing application and at least one application other than a digital image sharing application. The communications applications may include an alerting application that sends alerts and reminders to users and at least one application other than an alerting application that sends alerts and reminders to users. The communications applications may include an application for sharing and exchanging contact information and at least one application other than an application for sharing and exchanging contact information.

The multiple applications may include other sharing applications. The other sharing applications may include an electronic journal application and at least one application other than an electronic journal application. The other sharing applications may include an e-mail filtering application and at least one application other than an e-mail filtering application. The other sharing applications may include an application that enables the specification of parental controls over a child account and at least one application other than an application that enables the specification of parental controls over a child account.

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings may indicate like elements.

DETAILED DESCRIPTION

People lists are lists of contacts, for example, with each contact stored in a people list as a single identifier. The single identifier may be an e-mail address, a screen name, a cell phone number, or any other identifier capable of uniquely identifying the corresponding contact. A people list may be accessed from a central people list repository by multiple applications to address messages. For example, an e-mail application may use a people list to specify the recipients of an e-mail message and a digital image sharing application may use the same people list to specify the recipients of a shared digital image.

People lists may be actively created through the specification of a single identifier for each of the contacts to be included in the people list. People lists also may be created passively through automatic detection of a set of contacts that are repeatedly specified as the recipients of messages, where the set of contacts repeatedly receiving messages include the members of a passively created people list. People lists also may be created through the integration of existing lists from within the multiple applications into the set of people lists. For example, distinct people lists may be created based on each of the named groups within a buddy list of an instant messaging application.

Once created, people lists may be shared to prevent the need for duplicate creation of a people list for use by multiple people. The person who originally creates the people list shares the people list by sending copies to each of the people with whom the list is to be shared. If any of the people holding a copy of the people list makes any changes to the people list, the changes may be automatically propagated to the other copies of the people list.

Figure 1:
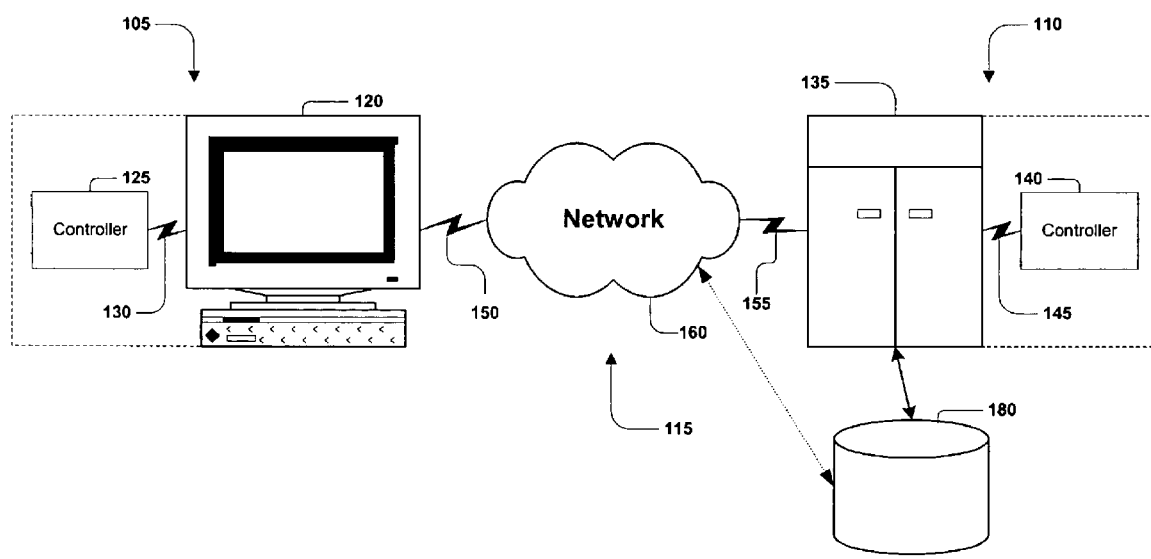
FIG. 1 is a block diagram of a communications system.
Figure 2:
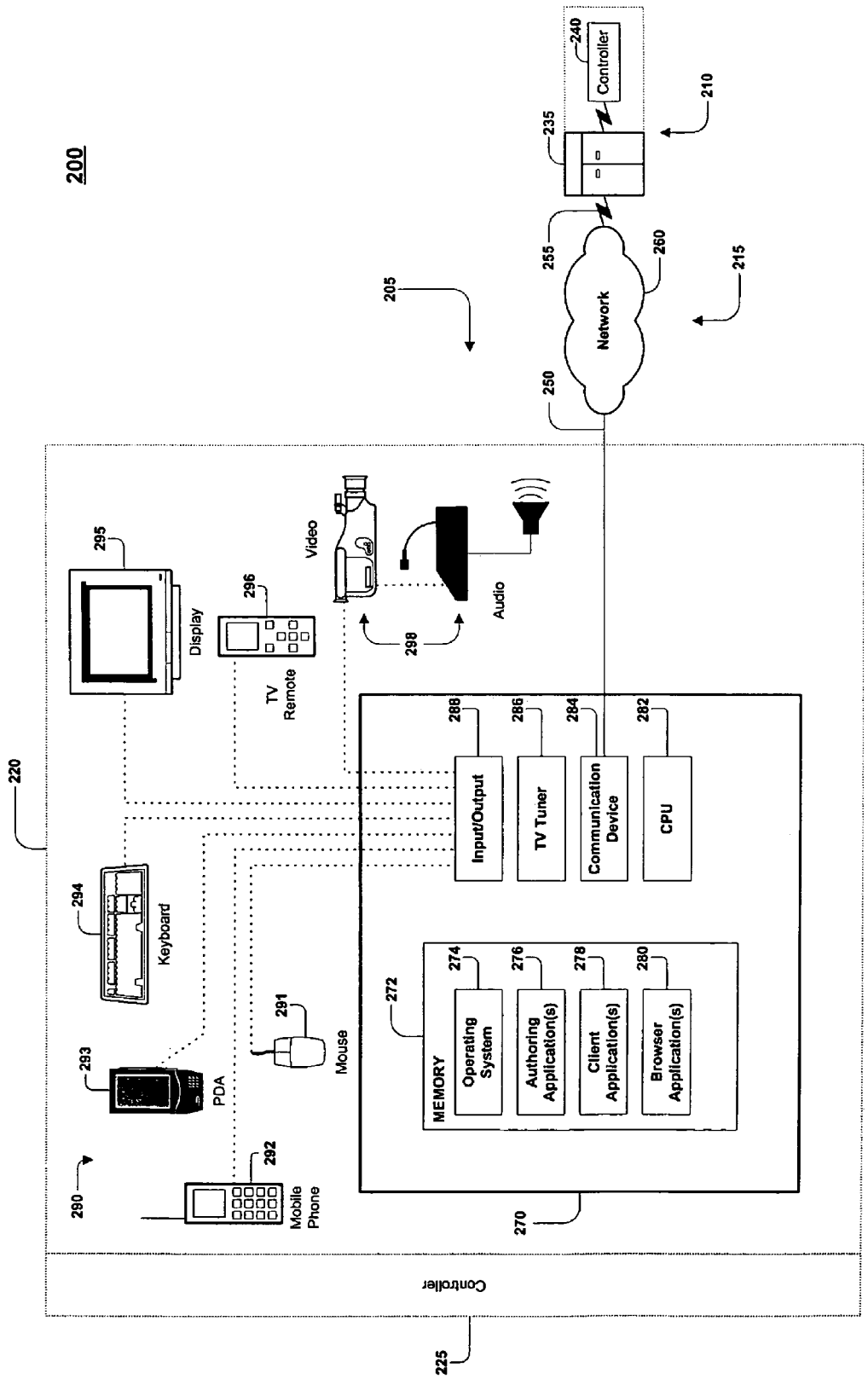
FIGS. 2 and 3 are expansions of the block diagram of FIG. 1.
Figure 3:
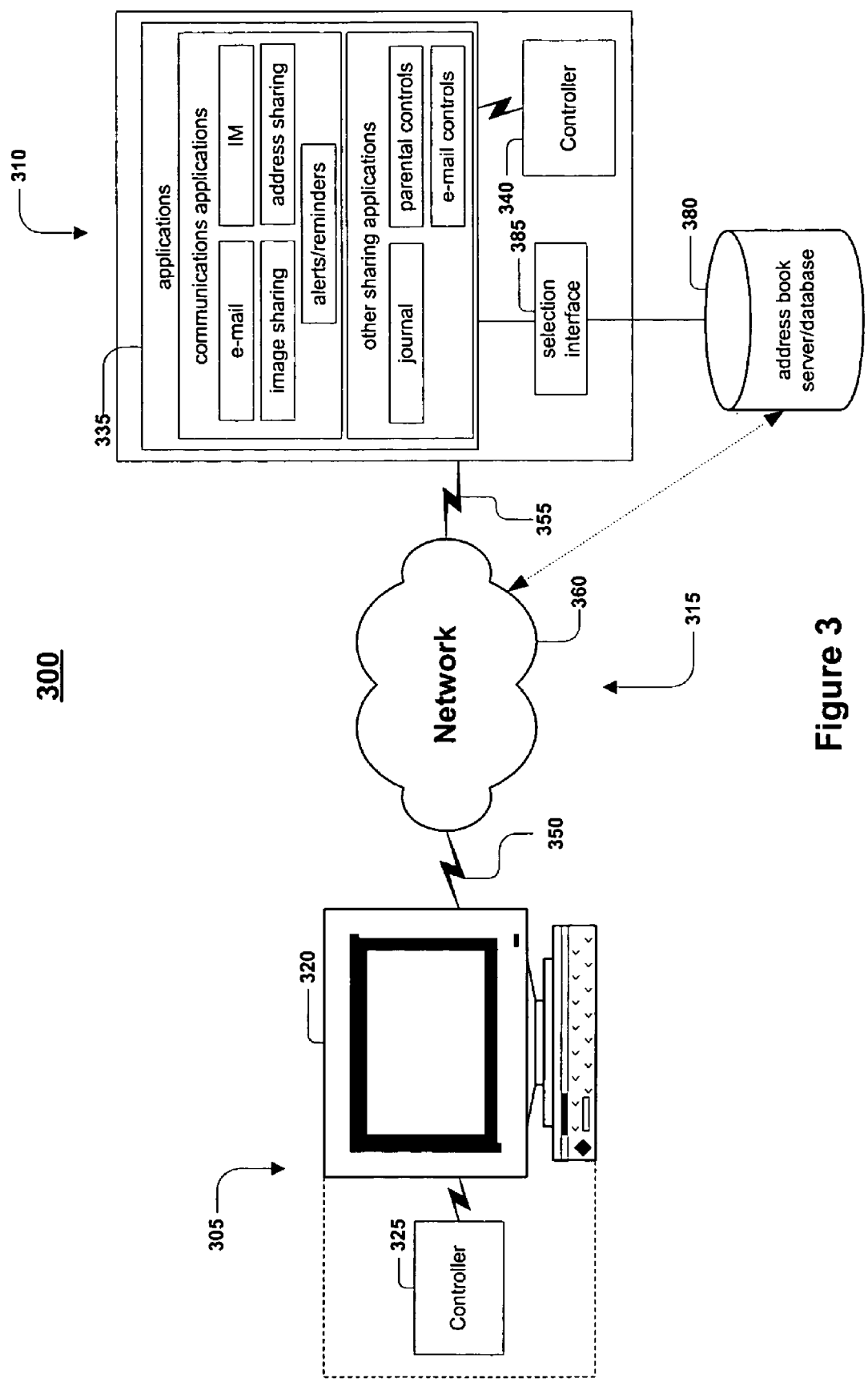

For illustrative purposes, FIGS. 1-3 show an example of a communications system for implementing techniques for transferring electronic data. People lists may be used to address communications sent using the communications system illustrated in FIGS. 1-3. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 1, a communications system 100 is capable of delivering and exchanging data between a requester system 105 and a provider system 110 through a communications link 115. The requester system 105 may include a client system and the provider system 110 may include a host system. The requester system 105 typically includes one or more requestor devices 120 and/or requester controllers 125, and the provider system 110 typically includes one or more provider devices 135 and/or provider controllers 140. For example, the requester system 105 or the provider system 110 may include one or more general-purpose computers (e.g., personal computers), one or more special-purpose computers (e.g., devices specifically programmed to communicate with each other and/or the requester system 105 or the provider system 110), or a combination of one or more general-purpose computers and one or more special-purpose computers. The requester system 105 and the provider system 110 may be arranged to operate within or in concert with one or more other systems, such as, for example, one or more Local Area Networks ("LANs") and/or one or more Wide Area Networks ("WANs").

The provider system 110 may include a communication interface such as an electronic mail gateway. For instance, the provider system 110 may include a dedicated mailing system that is implemented by specialized hardware or executed by a general purpose processor capable of running various applications, such as electronic mailer programs, and capable of employing various file transfer protocols, such as the Simple Mail Transfer Protocol ("SMTP"). The communications interface of provider system 110 enables communications between the provider system 110 and other systems through, for example, communications link 115.

The requester device 120 (or the provider device 135) is generally capable of executing instructions under the command of a requester controller 125 (or a provider controller 140). The requester device 120 (or the provider device 135) is connected to the requester controller 125 (or the provider controller 140) by a wired or wireless data pathway 130 or 145 capable of delivering data.

The requester device 120, the requester controller 125, the provider device 135, and the provider controller 140 each typically include one or more hardware components and/or software components. An example of a requester device 120 or a provider device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The requester device 120 and the provider device 135 may include devices that are capable of peer-to-peer communications.

An example of a requester controller 125 or a provider controller 140 is a software application loaded on the requester device 120 or the provider device 135 for commanding and directing communications enabled by the requester device 120 or the provider device 135. Other examples include a program, a piece of code, an instruction, a device, a computer, a computer system, or a combination thereof, for independently or collectively instructing the requester device 120 or the provider device 135 to interact and operate as described. The requester controller 125 and the provider controller 140 may be embodied permanently or temporarily in any type of machine, component, physical or virtual equipment, storage medium, or propagated signal capable of providing instructions to the requester device 120 or the provider device 135.

The communications link 115 typically includes a delivery network 160 making a direct or indirect communication between the requester system 105 and the provider system 110, irrespective of physical separation. Examples of a delivery network 160 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

An electronic information store 180 may be connected to the provider system 110, included as a component of the provider system 110, and/or connected to the delivery network 160. The electronic information store 180 may be a repository for electronic information that may be in an indexed and/or searchable format.

FIG. 2 illustrates a communications system 200 including a requester system 205 communicating with a provider system 210 through a communications link 215. Requestor system 205 typically includes one or more requestor devices 220 and one or more requestor controllers 225 for controlling the requestor devices 220. Provider system 210 typically includes one or more provider devices 235 and one or more provider controllers 240 for controlling the provider devices 235. The communications link 215 may include communication pathways 250 and 255 that enable communications through the one or more delivery networks 260.

Examples of each element within the communications system of FIG. 2 are broadly described above with respect to FIG. 1. In particular, the provider system 210 and communications link 215 typically have attributes comparable to those described with respect to the provider system 110 and the communications link 115 of FIG. 1. Likewise, the requestor system 205 of FIG. 2 typically has attributes comparable to and illustrates one possible implementation of the requestor system 105 of FIG. 1.

The requestor device 220 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, calendar programs, or graphics programs) capable of generating documents or other electronic content; client applications 278 (e.g., stand alone e-mail client or AOL client, CompuServe client, AIM client, AOL TV client, or ISP client, all of which may include a built-in or embedded e-mail and/or instant messaging client) capable of communicating with other computer users, accessing various computer resources, and viewing, creating, or otherwise manipulating electronic content; browser applications 280 (e.g., Netscape's Navigator or Microsoft's Internet Explorer) capable of rendering standard Internet content and also capable of supporting a web-based e-mail and/or instant messaging client; and other applications such as a digital image sharing application.

The general-purpose computer 270 also includes a central processing unit 282 (CPU) for executing instructions in response to commands from the requestor controller 225. In one implementation, the requestor controller 225 includes one or more of the application programs installed on the internal or external storage 272 of the general-purpose computer 270. In another implementation, the requestor controller 225 includes application programs stored in and performed by one or more device(s) external to the general-purpose computer 270.

The general-purpose computer also includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV tuner 286 for receiving television programming in the form of broadcast, satellite, and/or cable TV signals. As a result, the requestor device 220 can selectively and/or simultaneously display network content received by communications device 284 and television programming content received by the TV tuner 286.

The general-purpose computer 270 typically includes an input/output interface 288 for wired or wireless connection to various peripheral devices 290. Examples of peripheral devices 290 include, but are not limited to, a mouse 291, a mobile phone 292, a personal digital assistant 293 (PDA), a MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the requestor device 220. For example, the mobile phone 292 or the PDA 293 may include computing and networking capabilities and function as a requester device 220 by accessing the delivery network 260 and communicating with the provider system 210. Furthermore, the requestor system 205 may include one, some or all of the components and devices described above.

FIG. 3 illustrates a communications system 300 including a requestor system 305 communicating with a provider system 310 through a communications link 315. The requester system 305 typically includes one or more requestor devices 320 and one or more requestor controllers 325 for controlling the requestor devices 320. Provider system 310 typically includes one or more provider devices 335 and one or more provider controllers 340 for controlling the provider devices 335. The communications link 315 may include communication pathways 350 and 355 that enable communications through the one or more delivery networks 360.

Examples of each element within the communications system of FIG. 3 are broadly described above with respect to FIG. 1. In particular, the requestor system 305 and communications link 315 typically have attributes comparable to those described with respect to the requestor system 110 and the communications link 115 of FIG. 1. Likewise, the provider system 310 of FIG. 3 typically has attributes comparable to and illustrates one possible implementation of the provider system 110 of FIG. 1.

The provider device 335 typically includes or enables access to one or more applications. The applications may be used to deliver or control messages sent and received by users of the requestor devices 320. The applications may be categorized into two groups: communications applications used to send and receive messages and other sharing applications. Examples of communications applications include an e-mail application, an instant messaging application, a digital image sharing application, an application for sharing contact information, and an application for sending alerts and reminders. Examples of other sharing applications include an e-mail filtering application, an application for specifying parental controls over a parental account, and an electronic journal application. Other applications capable of controlling communications also may be included in the provider device 335. The users of the requestor system 305 use the requestor devices 320 to create messages, and the created messages are given to the applications included in the provider device 335 for delivery.

The applications included in the provider device 335 are capable of executing instructions in response to commands from the provider controller 340. In one implementation, the provider controller 340 includes one or more of the application programs installed on the provider device 335. In another implementation, the provider controller 340 includes application programs stored in and performed by one or more device(s) external to the provider device 335.

An address book server and database 380 may be connected to the provider system 310, included as a component of the provider system 310, and/or connected to the delivery network 360. The address book server and database 380 is broadly described above with respect to FIG. 1. The address book server and database 380 typically has attributes comparable to and illustrates one possible implementation of the electronic information store 180 of FIG. 1. The address book server and database 380 may be a repository for contact information that may be in an indexed and/or searchable format. The address book server and database 380 may store pairs of names and identifiers for individual contacts as well as for people lists. The identifiers stored by the address book server and database 380 may be used to address messages delivered by the applications included in the provider device 385, where the identifiers to be used may be selected through selection of the corresponding names stored in the address book server and database 380.

In one exemplary implementation, a selection interface 385 is included in the provider system 310 to facilitate the selection of names and, consequently, identifiers from the address book server and database 380. The selection interface 385 enables the selection of names from the address book. The message to be delivered is thereby addressed to the identifiers corresponding to the names selected in the selection interface 385. After the message is addressed, it is delivered to the specified recipients by the appropriate application from the provider device 335.

Alternatively or additionally, the selection interface 385 and the applications may be included in the requestor system 305 so that the recipients of the message to be sent may be specified before the message is given to the applications included in the provider device 335 for delivery. When the selection interface 385 is included in the requester system 305, the contents of the address book server 380 may be accessed and/or transferred over the communications link 315 to the requester system 305, where the contents are displayed by the selection interface 385. The applications included in the provider device 335 may immediately deliver a message to the recipients that have been specified through the selection interface 385 included in the requestor system 305. In addition or alternatively, the address book server and database 380 and the selection interface 385 may be included in the requester system 305.

The majority of the activity of the communications system illustrated in FIGS. 1-3 involves the communication and sharing of messages and information. The users of the communications system 100, 200, or 300 may send various kinds of information to one another, including e-mail messages, instant messages, digital images, address information, and alerts or reminders. Typically, a different application exists for using the communications system 100, 200, or 300 to send each type of message. Within each application, a user may actively specify a list of people with which communications regularly occur using that application.

People lists are lists of identifiers of people to whom messages may be sent. People lists represent filtered versions of a single list of contacts with whom a user communicates. The identifiers included in a people list are used to address messages to the people corresponding to the identifiers when the people list that includes the identifiers is chosen. People lists may be stored in an address book or in some other central repository that may be accessed by multiple applications.

Each of the applications may access the central repository of people lists when addressing a message. One or more people lists may be chosen as a recipient of the message, and the message is sent to the people corresponding to the identifiers in the people list. In this way, people lists function in the same way as e-mail addresses or screen names in that people lists are used to specify the recipients of a message. Several applications access the same central repository of people lists, so specification of people lists only needs to occur in one place at one time. Additionally or alternatively, all or a portion of the central repository of people lists may be communicated to a local device (e.g., requestor device 120, 220, or 320) for access and use by the applications on the local device. In one exemplary implementation, the people lists may be transferred to the local device for a temporary duration. Any changes to the people lists while on the local device including any additions, deletions, and edits, may be communicated to the central repository of people lists such that the central repository of people lists is updated.

In some applications, people lists may be used to specify the recipients of a message or some other form of shared information. For example, a people list may be used in an e-mail application to specify the direct recipients, the carbon copied recipients, or the blind carbon copied recipients of an e-mail message. A people list may be used by an instant messaging application to address an instant message that is broadcast simultaneously to multiple people. A people list may specify the recipients of images shared through use of a digital image sharing application. A people list may specify the contacts that receive address information and updates to the address information that are sent by an address sharing application. Finally, people lists may indicate the contacts that are sent alerts and reminders from an alerting application.

In addition, people lists may be used as access control lists. For example, a people list may be used by an e-mail filtering application to specify the contacts from which e-mail messages are accepted. Messages from contacts included in the people list may be accepted, while messages from people not included in the people list may be blocked. On the other hand, a people list may be used by the e-mail filtering application to specify the contacts from which e-mail messages are blocked. In this case, messages from contacts included in the people list may be blocked while messages from contacts not included in the people list may be accepted. A similar behavior may be implemented by an application through which parental controls over a child account are specified. People lists may be used to specify contacts from which communications are accepted or rejected by the child account, as the case may be. Similarly, people lists may be used by an electronic journal application to specify the contacts that are allowed or disallowed access to the electronic journal.

A single people list may be used by multiple applications to address multiple kinds of messages. For example, a single people list may be used to address an instant message sent by an instant messaging application, as well as specify the recipients of a set of shared images from a digital image sharing application. In addition, a single people list may be used to address an e-mail as well as an instant message that is sent to the people contained in the single people list. Moreover, a single people list may be used by a mail filtering application to specify contacts from which e-mails accepted or blocked and also by an application enabling the specification of parental controls over a child account to specify the contacts from which communications are accepted or blocked by the child account. A single people list may be used by any number of communications applications after only a single specification. For example, a single people list may be populated with contacts from whom spam e-mail messages were received in an e-mail application. The list may be used by an e-mail filtering application as well as an application for specifying parental controls to block communications from contacts included in the list.

If an identifier contained in a people list may not be used by a particular application, then the user that chose the people list may be prompted to enter an identifier that may be used by the application. For example, the user may be prompted for an e-mail address of a contact whose cellular phone number is stored in the people list when the people list is being used by an e-mail application. When the user is not prompted for a usable identifier, then the unusable identifier is omitted, and the corresponding contact is not included in the action taken on the people list. Continuing the above example, if the user is not prompted for an e-mail address, then the message being created by the e-mail application is not sent to the contact whose cellular phone number is stored in the people list.

A people list is identified and selected by a name that is unique among the names of the other people lists stored in the central repository. In the event that multiple non-identical people lists are stored within the central repository with the same name, then the names of the conflicting people lists are automatically modified.

People lists may be created manually or automatically. When creating a list manually, a user must specify a name for the people list as well as the identifiers of the people to be included in the people lists. When created automatically, a system may automatically detect a set of people that could include a people list. The system may prompt the user for a name of the automatically detected set of people.

Figure 4:
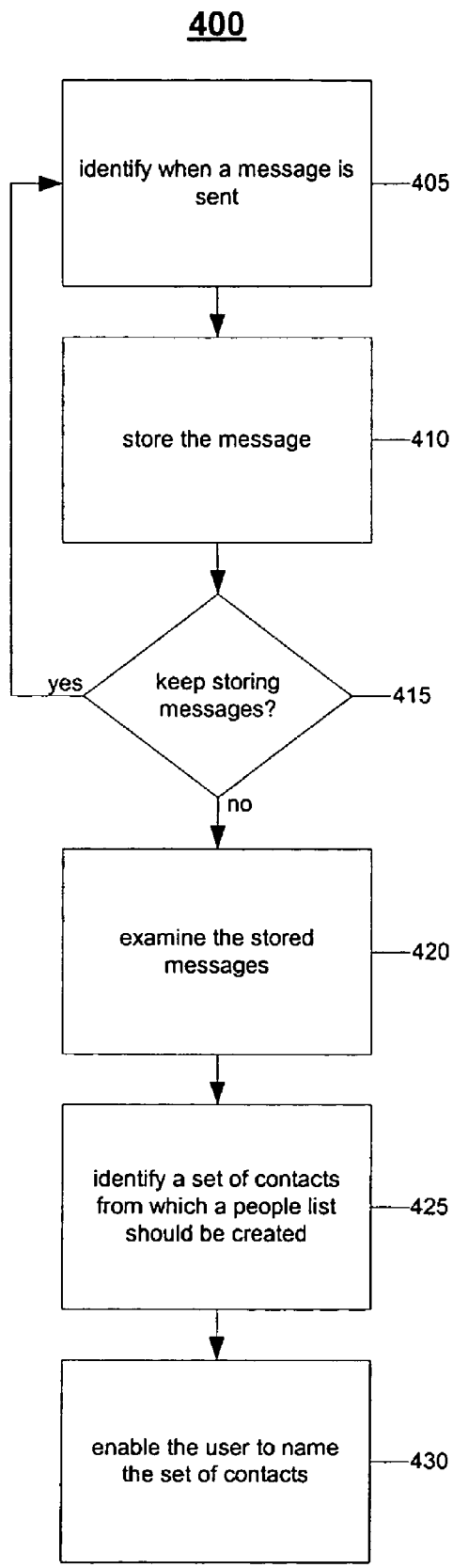
FIGS. 4 and 7 are flow charts of processes for automatically creating and storing a people list.

Referring to FIG. 4, a process 400 for automatically recognizing a set of recipients that have been repeatedly specified as recipients of messages enables the automatic specification of a people list. After a set of contacts are identified as repeated recipients of messages, the set is given a name, and that set becomes a people list that can be used to quickly specify the set of contacts as the recipients of a message in the future. The process 400 monitors the communications sent from at least one application before suggesting that a set of contacts should be formalized into a people list.

The process 400 begins with the monitoring of the messages sent by the various applications. It is identified when a message is sent (405), and the message is stored for later analysis (410). A determination is made as to whether to keep storing messages (415). Messages may be detected and stored for a certain amount of time or until a certain number of messages have been stored. If more messages are to be stored, more messages are identified when sent (405) and stored (410) until no more messages are to be stored (415).

After identifying and storing sent messages, the set of stored messages is analyzed (420). The analysis attempts to identify a sender-specified set of contacts from which a people list may be created (425). The set of contacts typically are identified from the recipients of the stored messages. A variety of criteria may be used to determine if a people list should be created out of a set of contacts grouped by a sender that have repeatedly received messages. For example, one criterion may dictate that a certain percentage of the total messages sent be addressed to the set of contacts before the sender-specified set of contacts is identified as a candidate for a people list. Alternatively, a certain number of messages may need to be sent to the set of recipients within a certain amount of time before the set of contacts is made into a people list. The application that sent the messages may influence whether a set of contacts is made into a people list. For example, if a set of contacts is sent two e-mail messages, then the set of contacts may be made into a people list, but if a set of contacts is sent two images from a digital image sharing application, then the set of contacts may not be made into a people list. Other criteria are possible, and combinations of criteria may be used to determine if the set of contacts should be made into a people list. For example, a certain percentage of e-mail messages and a certain frequency of instant messages sent to the set of contacts may be required before the set of contacts is made into a people list. In these cases, the sets of contacts from which a people list may be generated are created by the sender of the stored messages and are not created as a result of the analysis of the stored messages.

For example, consider that the e-mail messages sent and digital images shared by a user are stored for a two-week period. The analysis of the stored e-mail messages reveals that the user addressed five e-mail messages to a specific set of contacts during the two-week period. The analysis may suggest that the set of contacts is converted into a people list. The analysis also may reveal that the user specified a group of contacts with which ten digital images were shared, which may lead to the suggestion that the group of contacts be converted into a people list. Similarly, if two e-mail messages and six digital images are sent to a user-specified group of contacts, the group of contacts may be identified as a candidate for a people list.

When a set of contacts is identified for conversion into a people list, the user is prompted to give a name to the set of contacts to formally create a people list including the set of contacts (430). The user also may choose to reject the conversion of the identified set of contacts into a people list. In doing so, the user also may choose to delay the later suggestion that the identified set of contacts be converted into a people list. When a set of contacts is identified for conversion into a people list, the set of contacts has been used a requisite amount. The next time the set of contacts is used, the set of contacts still will have been used the requisite amount. In one implementation, delaying the later suggestion that the set of contacts be converted into a people list may include removing from memory all previous uses of the set of contacts. In another implementation, delaying the later suggestion may include increasing the requisite amount of use of the set of contacts that triggers the suggestion to the user that the set of contacts be converted to a people list.

People lists also may be created automatically through integration from other applications. For example, the groups within a buddy list from an instant messaging application may be used to specify people lists within the central repository. Similarly, e-mail address lists stored within an e-mail application may be integrated into the central repository as people lists. After integration, the lists in the applications from which the people lists were created may be connected to the people lists such that any changes made to the people lists are automatically reflected in the applications, and vice versa. For example, any changes made to a group in a buddy list of an instant messaging application may be reflected in the corresponding people list, and vice versa. Options also may exist for importing people lists from the central repository into, for example, the buddy list, as new groups.

After creation, people lists may be shared with others. A copy of the people list to be shared is sent to each of the people with whom the list is to be shared. Whenever a change is made to the people list, the shared copies of the people list are updated to reflect the change. People lists may be changed through use of an interface that displays the members of the people lists contained within the central repository and enables the addition and deletion of identifiers from the people lists.

Once specified, people lists also may be used to address messages sent by the communications applications. When creating a message within a communications application, an interface for selecting people lists as recipients of the message may be displayed. The interface includes a list of available people lists and contacts to whom the message may be sent. Selecting the people lists or contacts in the lists addresses the message to the selected people lists or contacts. People lists also may be modified within the selection interface. People lists also may be suggested automatically as recipients of the message based on a determination that the identifiers included in the people list may be the intended recipients of the message.

Figure 5:
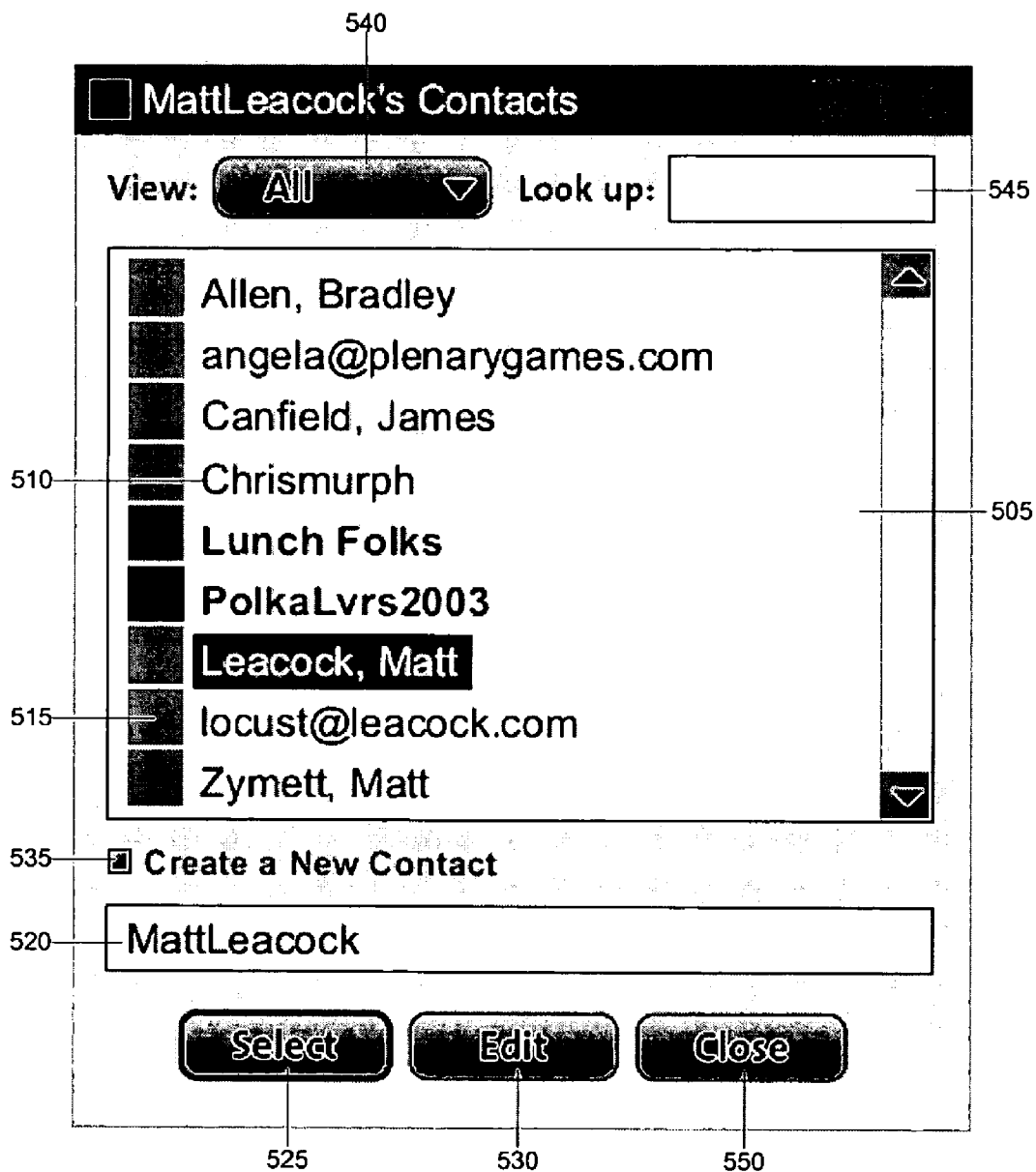
FIG. 5 is an illustration of an interface for selecting people or groups of people to whom a message is sent.

Referring to FIG. 5, a selection interface 500 enables the selection of people lists as recipients of messages sent by multiple applications. Each of the applications displays the selection interface 500 to enable specification of the recipients of a message sent by the particular application. For example, an e-mail application accesses the selection interface 500 to allow the user to specify the recipients of an e-mail message. The selection interface 500 also may be used to create new and modify existing people lists. The new or modified people lists may be selected as recipients of the message for which the selection interface 500 was displayed.

The selection interface 500 includes a contact list 505 that includes the possible recipients of a message for which the selection interface 500 was displayed. The possible recipients may be single contacts or people lists that include multiple contacts. Each of the contacts or people lists is listed in the contact list 505 by a name 510. The name 510 may be the name of a single contact or the name of a people list. Beside each name 510 is an icon 515 that indicates what is referred to by the corresponding name 510. For example, a particular icon 515 may be placed next to the name of a people list, while a different icon may be placed next to the name of a single contact. The icons 515 allow the user of the selection interface 500 to visually distinguish between the types of contacts included in the contact list 515.

After a contact has been selected from the contact list 505, information about the selected contact is placed within the details text field 520. The details text field 520 displays the information that will be entered on the message for which the selection interface 500 was displayed. If a single contact is selected, then a single identifier of the selected contact is listed in the details text field 520. For example, in the illustrated selection interface 500, the single contact named "Leacock, Matt" has been selected, and the identifier "MattLeacock" is listed in the details text field 520. If a people list is selected, then identifiers of all of the contacts included in the people list are listed in the details text field 520. If an identifier or identifiers is missing for a selected contact or people list, the details text field 520 is left empty. If more than one contact or people list is selected from the contact list 505, then the details text field 520 is left empty.

Selecting a select button 525 after one or more contacts or people lists have been selected enters the identifiers of the selected contacts or people lists in the message. The application determines where the recipient information is located within the message. After the select button 525 is selected, any selected names in the contact list 505 are deselected. Alternatively or additionally, pressing the enter key on the keyboard may enter the identifiers of the selected contacts of people lists in the message and deselect the selected names.

Selected contacts and people lists also may be edited using the selection interface 500. Selecting on an edit button 530 creates an interface for modifying a selected contact or people list. If a contact is selected, an interface for modifying the identifier associated with the contact is displayed. If a people list is selected, an interface for adding, deleting, or modifying identifiers in the selected people list is presented. If more than one contact or people list is selected, then a message indicating that only one contact or people list may be edited at a time is displayed.

Similarly, contacts and people lists may be created using a creation button 535. Pressing the creation button 535 displays an interface for creating a new contact or people list. In either case, a name may be entered for the new contact or people list. If a new contact is being specified, then a single identifier is entered on the interface to correspond to the entered name. If a people list is being specified, then multiple identifiers are entered on the interface. The new contact or people list is added to the contact list 505 after full specification in the interface for creating a new contact or people list.

In one exemplary implementation, selected contacts and people lists may be edited by mousing-over a particular contact or people list causing an interface to be presented for adding, deleting, or modifying identifiers.

The contact list 505 may be filtered to include only a subset of the available contacts or people lists using a filter selection box 540. The name of a category of contacts or people lists may be selected from the filter selection box 540. Only those contacts or people lists belonging to the category selected in the filter selection box 540 are included in the contact list 505. For example, in the illustrated selection interface 500, the default category "All" is selected in the filter selection box 540, so all of the available contacts are listed in the contact list 505. The listed contacts or people lists may then be selected as recipients of the message corresponding to the selection interface 500.

A user may search the contact list 505 using a search text field 545. Any contacts or people lists in the category selected in the filter selection box 540 with a name that matches the text entered into the search text field 545 is listed in the contact list 505. The listed contacts or people lists may then be selected as recipients of the message corresponding to the selection interface 500. After all recipients of the message have been selected and all changes to the set of contacts and people lists have been made, the selection interface 500 may be dismissed through use of a close button 550.

People lists may be acted upon in ways other than selection as recipients of messages created by applications. For example, people lists may be printed. When a people list is printed, the identifiers included in the people lists are printed.

The permissions of all contacts within a people list are automatically set to be the same, and setting permissions for a people list sets permissions for each of the contacts included in the people list. For example, all the contacts within a people list have the same level of access (i.e., read only or read and write) to an electronic journal to which the people list was given access. Moreover, when contacts are added to a people list, the permissions for the newly added contacts are set to be the same as the existing permissions of the other contacts included in the people list.

The central repository may store multiple people lists, and a particular identifier of a person may appear in multiple people lists stored within the central repository. The central repository also may include empty people lists that do not include any identifiers of people. However, a people list may not include another people list (i.e., nested people lists are not permitted). Limits may be placed on the maximum number of identifiers that may be placed within a single people list, as well as the maximum number of people lists that may be stored within the repository.

Figure 6:
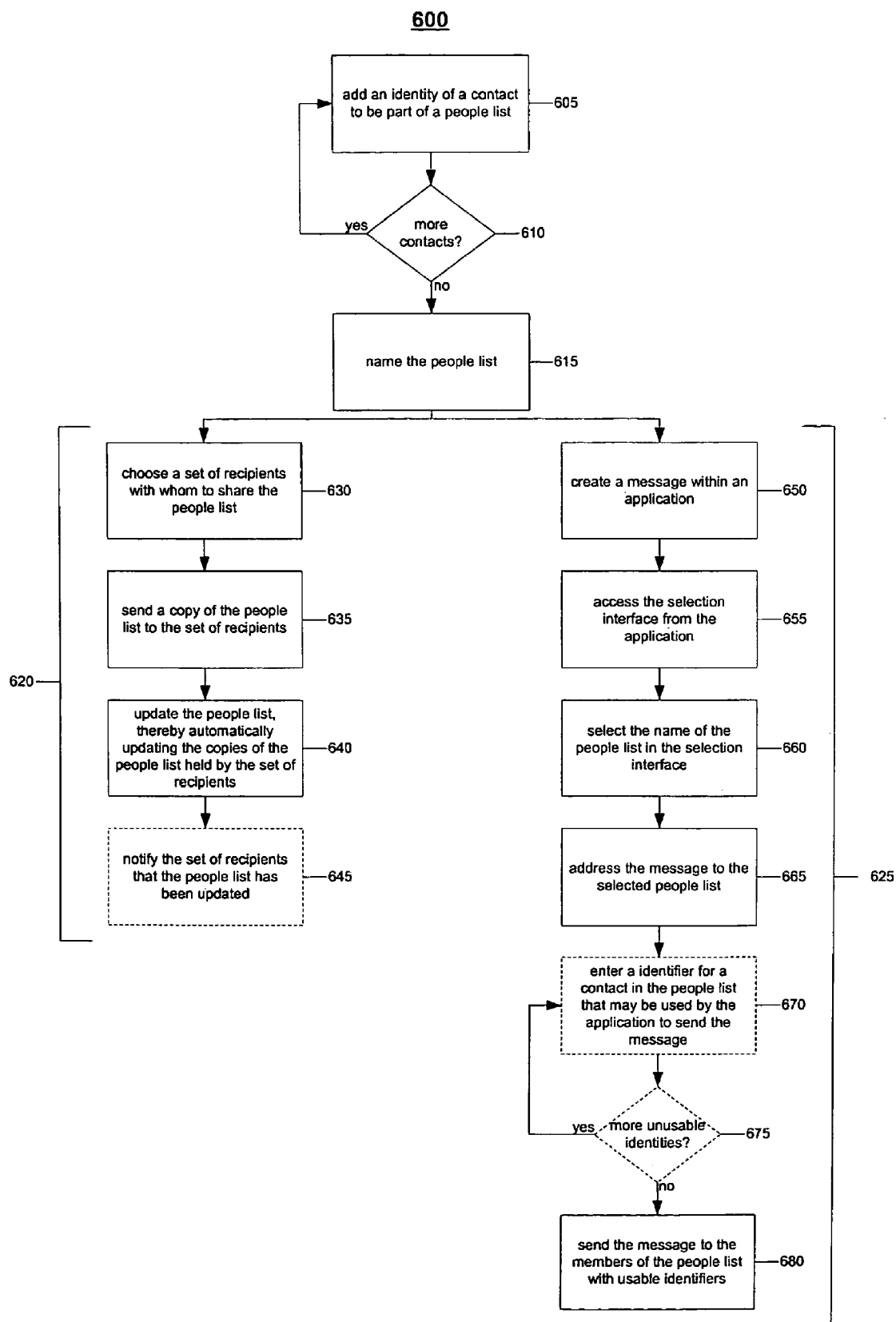
FIG. 6 is a flow chart of specifying, sharing, and using people lists.

Referring to FIG. 6, a process 600 is performed to specify, share and use a people list. The process 600 enables the specification of a group of contacts to be used to address communications sent from multiple applications. Sharing the group enables multiple users to use the group of contacts to address communications sent from multiple applications.

The process 600 begins with the specification of a people list. An identifier of a contact is added to the people list (605). A check is made as to whether more contacts are to be added to the people list (610). If so, then an identifier of another contact is added to the people list (605). In this manner, an identifier for each of the contacts to be included in the people list is added to the people list. Once a determination is made that no more contacts are to be added to the group (610), the group is given a name (615), thus completing the specification of the people list.

After the people list has been specified, it may be used or shared. Branch 620 illustrates a sub-process for sharing a people list, while branch 625 illustrates a sub-process for using a people list. The sub-processes illustrated by branches 620 and 625 are not mutually exclusive in that both may occur. In addition, the sub-processes illustrated by branches 620 and 625 may be performed in any order. Moreover, the sub-processes illustrated by branches 620 and 625 may be repeated any number of times after the people list has been specified.

To share the people list, a sub-process illustrated by branch 620 is performed. A set of recipients with whom the people list is to be shared is chosen (630). A copy of the people list is sent to each of the recipients (635). Each of the recipients stores the people list and may then use the people list to address messages sent by multiple applications without having to specify the people list themselves. The people list may be modified by adding one or more contacts to the list, deleting one or more contacts from the list, or modifying the identifier of one or more of the contacts already contained in the list (640). Making changes to the people list locally causes the same changes to be made automatically to the copies of the people lists that are stored by the set of recipients. Each of the recipients optionally may be notified that each copy of the people list has been updated to reflect the changes made to the original copy of the people list (645). If one of the recipients makes changes to the people list, the changes also may be propagated to the other copies of the people list, including the original copy.

To use the people list, a sub-process illustrated by branch 625 is performed. A message is created using one of the applications (650). In order to specify the recipients of the message, an interface for selecting contacts or people lists, such as the selection interface 500 from FIG. 5, is accessed (655). The name of the people list is selected using the interface (660), and the identifiers corresponding to the selected people picker are used to address the message (665).

The identifiers corresponding to the people list may not be able to be used by the application to address the message. For example, the people list may include an instant messaging screen name as an identifier, which cannot be used to address an e-mail. In this case, an identifier that can be used by the application optionally may be entered for a contact in the list (670). A determination may be made as to whether the people list includes more identifiers that cannot be used to address the message sent by the application. (675). If so, an identifier that can be used by the application for another contact in the group is entered (670). In this way, all of the identifiers included in the people list that cannot be used by the application to address the message may be replaced with identifiers that may be used to address the message. Instead of prompting for usable identifiers, the application may simply omit the contacts included in the people list with an identifier that cannot be used and not send those contacts the message.

After the recipients of the message have been specified as the contacts included in the people list, the message is sent to those contacts (680). The choice of the members of the people list as the recipients of the message was independent of the application to send the message. The people list may be used to address a message sent by any application after a single specification.

Figure 7:
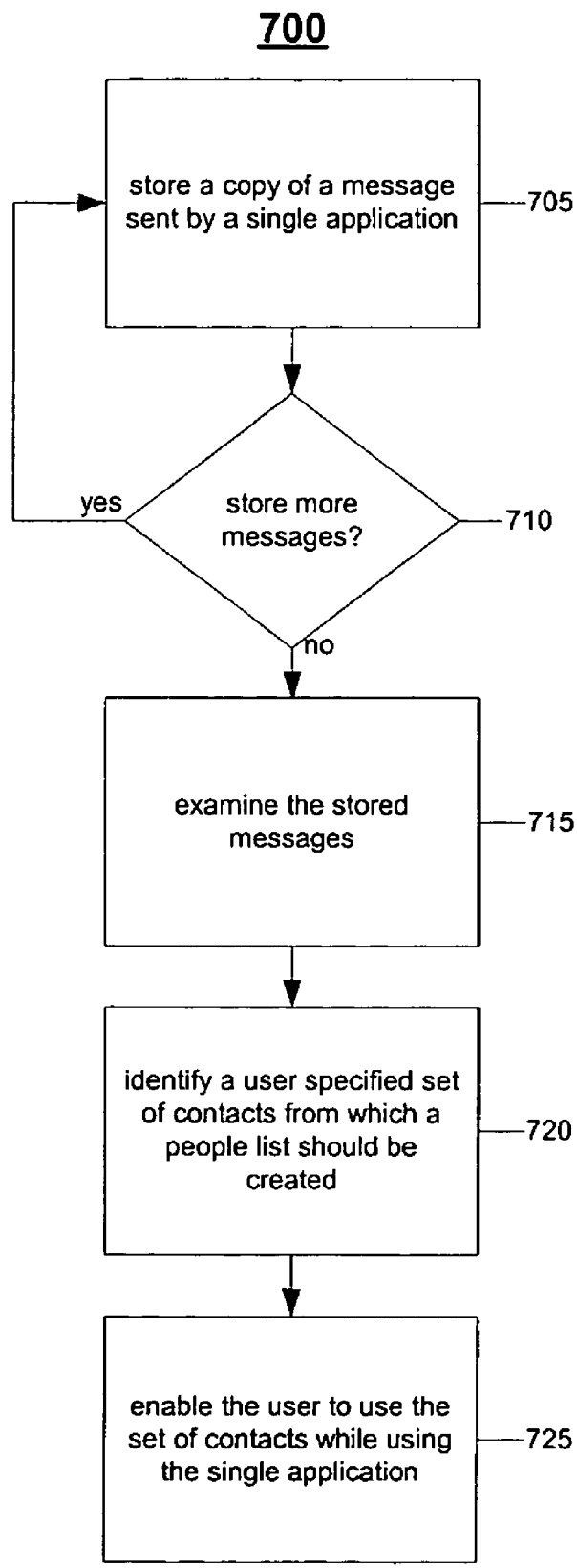

Referring to FIG. 7, a passive people list specification process 700 may be used in an environment local to a user of a single application to examine communications sent from the single application. The process 700 may identify groups of contacts specified by the user of the single application from which a people list may be created. The process 700 may be executed on a client device, such as the requestor system 105 from FIG. 1 and may be included as part of the single application. Two copies of messages sent from the single application are made. One copy of each message is stored locally for later analysis, and another copy is forwarded to a host system, such as the provider system 110 from FIG. 1, for delivery (705). A determination is made as to whether more messages should be stored (710). For example, messages may be stored for a certain amount of time or until a certain number have been stored. If enough messages have not been stored, copies of other messages sent by the single application are stored locally (705) until a determination is made that enough messages have been stored (710). At that point, the set of stored messages is examined (715). The analysis of the stored messages attempts to identify one or more user specified sets of contacts from which a people list may be created (720).

A variety of criteria may be used to determine if a people list should be created out of a set of contacts grouped by a sender that have repeatedly received messages. For example, one criterion may dictate that a certain percentage of the total messages sent be addressed to the set of contacts before the sender-specified set of contacts is identified as a candidate for a people list. Alternatively, a certain number of messages may need to be sent to the set of recipients within a certain amount or shifting window of time before the set of contacts is made into a people list. Other criteria also may be used. In these cases, the sets of contacts from which a people list may be generated are created by the sender of the stored messages and are not created as a result of the analysis of the stored messages.

For example, consider that the single application is an e-mail application and that five of the one hundred stored e-mail messages are addressed to the same user specified group of contacts. The analysis of the stored e-mail messages may suggest that the set of contacts is converted into a people list. As another example, consider that the single application is a digital image sharing application and that ten of the two hundred stored digital images were shared with a particular group of contacts. The analysis may suggest that the particular group of contacts be converted into a people list.

As yet another example, consider that the single application is an electronic journal application and that a journal entry was sent to the same user specified group of contacts each day of the period in which the journal entries were stored. The analysis of the stored journal entries may suggest that the set of contacts is converted into a people list. As yet another example, consider that the single application is an instant messaging application and that an instant message was sent to a user specified group of contacts every five hours every day of the period in which the instant messages were stored. The analysis of the stored instant messages may suggest that the set of contacts is converted into a people list.

As another example, consider that the single application is a contact information sharing application and that an update to contact information was sent to the same user specified group of contacts five times during the two-week period in which the updates were stored. The analysis of the stored updates may suggest that the set of contacts is converted into a people list. As another example, consider that the single application is an alerting application and that an alert was sent to the same user specified group of contacts once a week during the period in which the updates were stored. The analysis of the stored alerts may suggest that the set of contacts is converted into a people list.

When a set of contacts is identified for conversion into a people list, the user is made able to use the set of contacts as a people list while using the single application to send messages (725). Enabling the user to use the set of contacts as a people list may include enabling the user to name the people list created from the set of contacts for easy access and use.

Enabling the user to use the set of contacts as a people list also may include enabling the user simply to accept the suggestion that the set of contacts be converted into a people list. The user also may choose to reject the conversion of the identified set of contacts into a people list. In doing so, the user also may choose to delay the later suggestion that the identified set of contacts be converted into a people list. When a set of contacts is identified for conversion into a people list, the set of contacts has been used a requisite amount. The next time the set of contacts is used, the set of contacts still will have been used the requisite amount. In one implementation, delaying the later suggestion that the set of contacts be converted into a people list may include removing from memory all previous uses of the set of contacts. In another implementation, delaying the later suggestion may include increasing the requisite amount of use of the set of contacts.

Alternatively, local processes may be invoked to implement the features described with respect to the hosted implementations of FIGS. 4, 5, 6, and 7.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components.

For example, with respect to the passive people list specification process 700 described above in FIG. 7, instead of storing a copy of a message for later analysis regarding the set of contacts, the process simply may store just the set of contacts for later analysis and not a copy of the entire message. As other sets of contacts from other messages are stored, then a comparison may be performed to identify repeat usage of the same set of contacts in a message to make a suggestion to the user whether a people list may be created for this set of contacts.

Furthermore, people lists may be created/suggested for specific aspects of a user environment or subsets of the sharing applications, or they may be globally created/suggested.

Accordingly, other implementations are within the scope of the following claims.

What is claimed is:

1. A method for enabling management of contacts, the method comprising:
   passively recognizing that a plurality of contacts are, as a group, repeatedly sent communications by a member;
   identifying, to the member, the plurality of contacts that has been passively recognized as a plurality of contacts that are, as a group, repeatedly sent communications by the member;
   based on passively recognizing that the plurality of contacts are, as a group, repeatedly sent communications by the member, generating a contacts list that includes the plurality of contacts and that is useful in addressing future communications to the plurality of contacts as a group;
   enabling the member to associate a name with the contacts list; and
   enabling the member to address future communications to the plurality of contacts, as a group, through use of the name associated by the member with the contacts list.

2. The method of claim 1 wherein passively recognizing that the plurality of contacts are, as a group, repeatedly sent communications by the member comprises:
   storing communications sent by the member during a period of time;
   examining the communications sent by the member during the period of time; and
   identifying that the plurality of contacts was sent at least a minimum number of communications by the member during the period of time.

3. The method of claim 1 wherein passively recognizing that the plurality of contacts are, as a group, repeatedly sent communications by the member comprises:
   storing a predetermined number of communications sent by the member;
   examining the predetermined number of communications sent by the member; and
   identifying that the plurality of contacts was sent at least a minimum number of communications out of the predetermined number of communications by the member.

4. The method of claim 1 further comprising enabling the member to accept or to reject the generation of the contacts list.

5. The method of claim 4 further comprising enabling the member to delay the generation of a rejected contacts list.

6. The method of claim 1 further comprising enabling the member to assign a unique identifier to the contacts list.

7. The method of claim 1 wherein enabling the member to address future communications to the plurality of contacts through use of the name associated by the member with the list of contacts comprises enabling the member to address future communications to the plurality of contacts from multiple applications through the use of the name associated by the member with the list of contacts.

8. The method of claim 7 wherein the multiple applications include communications applications.

9. The method of claim 8 wherein the communications applications include an e-mail application and at least one application other than an e-mail application.

10. The method of claim 8 wherein the communications applications include an instant messaging application and at least one application other than an instant messaging application.

11. The method of claim 8 wherein the communications applications include a digital image sharing application and at least one application other than a digital image sharing application.

12. The method of claim 8 wherein the communications applications include an alerting application that sends alerts and reminders to users and at least one application other than an alerting application that sends alerts and reminders to users.

13. The method of claim 8 wherein the communications applications include an application for sharing and exchanging contact information and at least one application other than an application for sharing and exchanging contact information.

14. The method of claim 7 wherein the multiple applications include other sharing applications.

15. The method of claim 14 wherein the other sharing applications include an electronic calendar application and at least one application other than an electronic calendar application.

16. The method of claim 14 wherein the other sharing applications include an electronic journal application and at least one application other than an electronic journal application.

17. The method of claim 14 wherein the other sharing applications include an e-mail filtering application and at least one application other than an e-mail filtering application.

18. The method of claim 14 wherein the other sharing applications include an application that enables the specification of parental controls over a child account and at least one application other than an application that enables the specification of parental controls over a child account.

19. An apparatus comprising a computer readable medium having instructions stored thereon that when executed by a machine result in at least the following:
   passively recognizing that a plurality of contacts are, as a group, repeatedly sent communications by a member;
   identifying, to the member, the plurality of contacts that has been passively recognized as a plurality of contacts that are, as a group, repeatedly sent communications by the member;
   based on passively recognizing that the plurality of contacts are, as a group, repeatedly sent communications by the member, generating a contacts list that includes the plurality of contacts and that is useful in addressing future communications to the plurality of contacts as a group;
   enabling the member to associate a name with the contacts list; and
   enabling the member to address future communications to the plurality of contacts, as a group, through use of the name associated by the member with the contacts list.

20. A system for enabling management of contacts comprising:
   means for passively recognizing that a plurality of contacts are, as a group, repeatedly sent communications by a member;
   means for identifying, to the member, the plurality of contacts that has been passively recognized as a plurality of contacts that are, as a group, repeatedly sent communications by the member;
   means for generating a contacts list that includes the plurality of contacts based on passively recognizing that the plurality of contacts are, as a group, repeatedly sent communications by the member, the contacts list being useful in addressing future communications to the plurality of contacts as a group;
   means for enabling the member to associate a name with the contacts list; and means for enabling the member to address future communications to the plurality of contacts, as a group, through use of the name associated by the member with the contacts list.

21. A method for enabling management of contacts, the method comprising:
   passively recognizing that a plurality of contacts are, as a group, repeatedly sent communications by a member;
   identifying, to the member, the plurality of contacts that has been passively recognized as a plurality of contacts that are, as a group, repeatedly sent communications by the member;
   based on passively recognizing that the plurality of contacts are, as a group, repeatedly sent communications by the member, generating a contacts list that includes the plurality of contacts and that is useful in addressing future communications to the plurality of contacts as a group, wherein the contacts list includes identifiers corresponding to the contacts;
   enabling the member to associate a name with the contacts list;
   enabling the member to address future communications to the plurality of contacts, as a group, through use of the name associated by the member with the contacts list; and
   enabling the member to share a copy of the contacts list with an additional user through use of the name associated with the contacts list.

22. The method of claim 21 wherein passively recognizing that the plurality of contacts are, as a group, repeatedly sent communications by the member comprises:
   storing communications sent by the member during a period of time;
   examining the communications sent by the member during the period of time; and
   identifying that the plurality of contacts was sent at least a minimum number of communications by the member during the period of time.

23. The method of claim 21 wherein passively recognizing that the plurality of contacts are, as a group, repeatedly sent communications by the member comprises:
   storing a predetermined number of communications sent by the member;
   examining the predetermined number of communications sent by the member; and
   identifying that the plurality of contacts was sent at least a minimum number of communications out of the predetermined number of communications by the member.

24. The method of claim 21 wherein enabling the member to address future communications to the plurality of contacts through use of the name associated by the member with the list of contacts comprises enabling the member to address future communications to the plurality of contacts from multiple applications including at least one of an e-mail application, an instant messaging application, a digital image sharing application, an alerting application that sends alerts and reminders to users, and an application for sharing and exchanging contact.

25. The method of claim 21 wherein the method further comprises:

provproviding instructions to update the generated contacts list, wherein the shared copy of the contacts list is automatically updated in response to updating of the generated contacts list.

26. The method of claim 21 wherein the method further comprises:

receiving a communication sent to the member, the communication including an identifier of the sender;

comparing the identifier of the sender with the identifiers corresponding to the contacts; and determining whether the sent communication is spam based on a result of the comparison.

\* \* \* \* \*